United States Patent
Niemelä et al.

(10) Patent No.: US 10,412,078 B2
(45) Date of Patent: Sep. 10, 2019

(54) ADVANCED LOCAL-NETWORK THREAT RESPONSE

(71) Applicant: F-SECURE CORPORATION, Helsinki (FI)

(72) Inventors: Jarno Niemelä, Kirkkonummi (FI); Janne Pirttilahti, Espoo (FI); Marko Finnig, Helsinki (FI)

(73) Assignee: F-SECURE CORPORATION, Helsinki (FI)

( * ) Notice: Subject to any disclaimer, the term of this patent is extended or adjusted under 35 U.S.C. 154(b) by 0 days.

(21) Appl. No.: 15/726,456

(22) Filed: Oct. 6, 2017

(65) Prior Publication Data
US 2018/0103031 A1 Apr. 12, 2018

(30) Foreign Application Priority Data
Oct. 7, 2016 (GB) .................................. 1617035.9

(51) Int. Cl.
*H04L 29/06* (2006.01)

(52) U.S. Cl.
CPC ............ *H04L 63/083* (2013.01); *H04L 29/06* (2013.01); *H04L 63/0807* (2013.01); *H04L 63/1408* (2013.01); *H04L 63/1433* (2013.01); *H04L 63/1491* (2013.01)

(58) Field of Classification Search
None
See application file for complete search history.

(56) References Cited

U.S. PATENT DOCUMENTS

| | | | | |
|---|---|---|---|---|
| 5,890,189 | A * | 3/1999 | Nozue | G06F 12/109 711/100 |
| 8,832,389 | B2 * | 9/2014 | Desai | G06F 12/1491 711/153 |
| 8,973,142 | B2 * | 3/2015 | Shulman | H04L 63/1416 455/410 |
| 9,858,422 | B2 * | 1/2018 | Gschwind | G06F 9/4408 |
| 10,129,298 | B2 * | 11/2018 | Grady | H04L 63/0428 |

(Continued)

FOREIGN PATENT DOCUMENTS

WO    WO-2010/030169 A2    3/2010

OTHER PUBLICATIONS

United Kingdom Search Report issued by the United Kingdom Intellectual Property Office in relation to United Kingdom Application No. GB1617035.9 dated Mar. 15, 2017 (4 pages).

*Primary Examiner* — Harunur Rashid
(74) *Attorney, Agent, or Firm* — Carter, DeLuca & Farrell LLP; Robert P. Michal, Esq.

(57) ABSTRACT

There are provided measures for enabling advanced local-network threat response. Such measures could exemplarily comprise receiving, at a local-network honeypot entity, a username/password related authentication data in relation to a login attempt to the honeypot entity, triggering a threat response operation at a local-network backend entity upon detection of the username/password related authentication data, the threat response operation comprising testing validity of the username/password related authentication data in one or more local accounts of the local-network, and in case the username/password related authentication data is detected to be valid for any account in the local-network, determining that said account is compromised and locking the compromised account.

13 Claims, 3 Drawing Sheets

(56) References Cited

U.S. PATENT DOCUMENTS

| | | | |
|---|---|---|---|
| 2007/0080217 A1* | 4/2007 | Brabant | G06Q 20/347 235/382 |
| 2012/0297484 A1* | 11/2012 | Srivastava | G06F 21/552 726/23 |
| 2016/0014159 A1 | 1/2016 | Schrecker et al. | |
| 2016/0072838 A1 | 3/2016 | Kolton et al. | |
| 2016/0088000 A1* | 3/2016 | Siva Kumar | H04L 63/083 726/23 |
| 2016/0226853 A1 | 8/2016 | Wall | |
| 2016/0315954 A1* | 10/2016 | Peterson | H04L 63/1416 |
| 2016/0359876 A1* | 12/2016 | Touboul | G06F 21/577 |
| 2017/0346797 A1* | 11/2017 | Yedidi | H04L 63/06 |

* cited by examiner

ADVANCED LOCAL-NETWORK THREAT RESPONSE

CROSS-REFERENCE TO RELATED APPLICATION

This Application claims priority to United Kingdom Application No. 1617035.9, filed Oct. 7, 2016, the entire disclosure of which is incorporated herein by reference.

FIELD

The present invention relates to advanced local-network threat response. More specifically, the present invention relates to measures (including methods, apparatuses and computer program products) for enabling advanced local-network threat response.

BACKGROUND

In modern communication networks, security is a vital issue, and attacks on network security tend to be increasing in terms of both number and complexity. Authentication is a process of verifying a user in a communication network. It is a critical feature to support secure communications. However, attacks on authentication processes also tend to be increasing. Accordingly, appropriately responding to such security threats is paramount in modern communication networks.

For example, attackers pursuing to steal passwords from a memory may use Mimikatz, other tools or keylogging them from keyboard inputs. These are silent actions, meaning that there is no knowledge of when a password is being stolen or which passwords have been compromised. When an attacker has a password but no information exactly on which systems the password is valid for, then he is going to try it on multiple systems, possibly even on all systems he is able to see in a local network, for example. In addition to passwords, attackers could use only the password hash with pass-the-hash hacking techniques or use existing Kerberos authentication session of a user when trying to log into all systems he sees. When using Kerberos, for example, users do not have to enter passwords. Instead, the attacker will scan the network for services he is able to access with the user's Kerberos session.

Available systems for responding to such security threats suffer from various drawbacks, and it is thus desirable to improve security so as to overcome such drawbacks.

SUMMARY

Various exemplifying embodiments of the present invention aim at addressing at least part of the above issues and/or problems.

Various aspects of exemplifying embodiments of the present invention are set out in the appended claims.

According to an example aspect of the present invention, there is provided a method of local-network threat response, the method comprising: receiving, at a local-network honeypot entity, a username/password related authentication data in relation to a login attempt to the honeypot entity; triggering a threat response operation at a local-network backend entity upon detection of the username/password related authentication data by the local-network honeypot entity, the threat response operation comprising testing validity of the username/password related authentication data in one or more local accounts of the local-network; and in case the username/password related authentication data is detected to be valid for any account in the local-network on the basis of testing, determining that said account is compromised and locking the compromised account.

According to an example aspect of the present invention, there is provided an apparatus, comprising a memory configured to store computer program code, and a processor configured to read and execute computer program code stored in the memory, wherein the processor is configured to cause the apparatus to perform: receiving, at a local-network honeypot entity, a username/password related authentication data in relation to a login attempt to the honeypot entity; triggering a threat response operation at a local-network backend entity upon detection of the username/password related authentication data by the local-network honeypot entity, the threat response operation comprising testing validity of the username/password related authentication data in one or more local accounts of the local-network; and in case the username/password related authentication data is detected to be valid for any account in the local-network on the basis of testing, determining that said account is compromised and locking the compromised account.

According to an example aspect of the present invention, there is provided a computer program product, comprising computer-executable computer program code which, when the computer program code is executed on a computer, is configured to cause the computer to carry out a method according to the aforementioned method-related example aspect of the present invention, including any developments and/or a modifications thereof.

The computer program product may comprise or may be embodied as a (tangible/non-transitory) computer-readable (storage) medium or the like, on which the computer-executable computer program code is stored, and/or the program is directly loadable into an internal memory of the computer or a processor thereof.

Further developments and/or modifications of the aforementioned example aspects of the present invention are set out herein with reference to the drawings and exemplifying embodiments of the present invention.

By way of exemplifying embodiments of the present invention, realization of an advanced local-network threat response is enabled, which is capable of provide for both high speed and efficiency for responding to a security threat in a local network.

BRIEF DESCRIPTION OF THE DRAWINGS

In the following, the present invention will be described in greater detail by way of non-limiting examples with reference to the accompanying drawings, in which.

DETAILED DESCRIPTION

Figure 1:
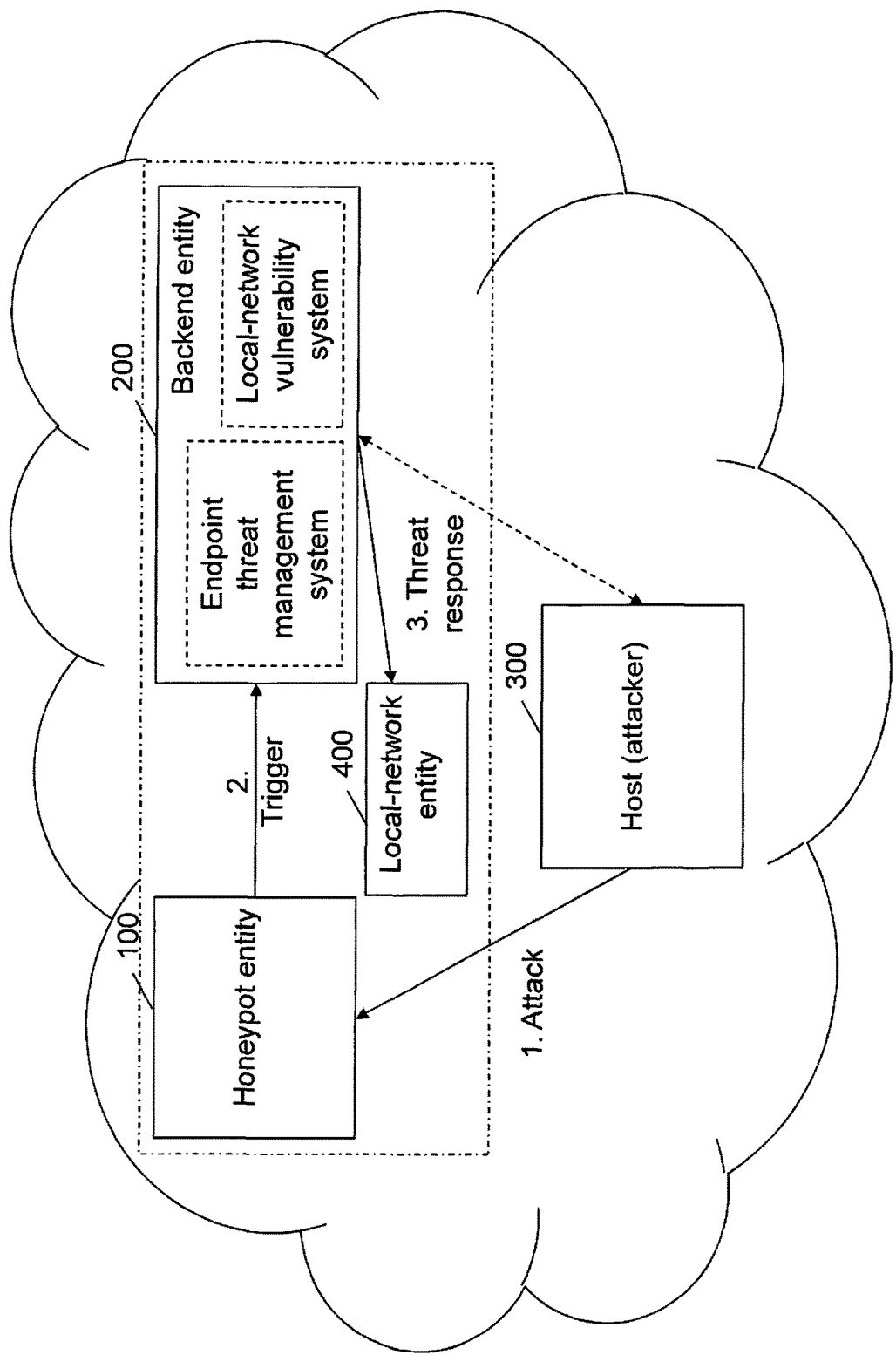
FIG. 1 shows a schematic diagram illustrating a system configuration underlying exemplifying embodiments of the present invention.

The present invention is described herein with reference to particular non-limiting examples and to what are presently considered to be conceivable embodiments of the present invention. A person skilled in the art will appreciate that the present invention is by no means limited to these examples, and may be more broadly applied.

Various types of systems are known for realizing a response to security threats, which are specifically designed for specific purposes or circumstances. Among these, the following systems shall be briefly mentioned.

Firstly, honeypot systems are known, in which a (allegedly) less-secured honeypot entity is provided so as to attract attacks. Such honeypot entity is or runs on a host (oftentimes in a lightweight implementation lacking certain capabilities of actual hosts) which appears to be part of a local network, but is isolated from actual hosts of the local network.

Secondly, endpoint threat detection systems are known, in which an endpoint agent is installed on hosts in a local network so as to monitor their behavior and, where appropriate, retrieve relevant security-related information from the hosts, e.g. to a backend entity. Based on such information, any host or any process thereof can be blocked or isolated in order to ensure security in response to a security threat.

Thirdly, local-network vulnerability management systems are known, in which a backend entity performs vulnerability scans of hosts in the local network, writes any detected vulnerabilities in a vulnerability management database and, upon demand, reads such vulnerabilities from the vulnerability management database.

Hereinafter, various exemplifying embodiments and implementations of the present invention and its aspects are described using several variants and/or alternatives. It is generally noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown.

According to exemplifying embodiments of the present invention, in general terms, there are provided measures and mechanisms for enabling local-network threat response, as described in more details below.

FIG. 1 shows a schematic diagram illustrating a system configuration underlying exemplifying embodiments of the present invention.

As shown in FIG. 1, exemplifying embodiments of the present invention may be based on a system configuration in which a local network, i.e. a network of a local domain (behind a firewall or the like), comprises at least one honeypot entity 100, at least one backend entity 200, and at least one host 300 and one local-network entity 400, such as a workstation or the like (generally, any type of endpoint can be a host here, including laptops, desktops, mobiles, servers, or the like). It is assumed that the host 300 represents an attacker attacking any entity in the local network, such as the honeypot entity 100. For the sake of simplicity, other entities of the local network are not shown.

The local network may be any kind of communication network, such as any kind of IP-based network (IP: Internet Protocol). Any one of the honeypot entity 100, the backend entity 200, the host 300 and the local-network entity 400 may be implemented by means of hardware (e.g. as a dedicated node or part of a node) and/or software (e.g. as a program or process running on any hardware).

As indicated by a dash-dotted box, a system according to exemplifying embodiments of the present invention may comprise at least one honeypot entity and at least one backend entity (either one of these being implemented in hardware and/or software). In such system, one or more honeypot entities and one or more backend entity may be implanted in the same or distinct hardware instances such as nodes or workstations.

As indicated by dashed boxes, a backend entity may structurally or functionally encompass an endpoint threat management system and a local-network vulnerability management system. That is, a backend entity may be operable as, for or within an endpoint threat management system and a local-network vulnerability management system.

As shown in FIG. 1, an embodiment of the present invention is generally based on an operational sequence of an attack (i.e. a security threat) which is initiated by the local-network host against the local-network honeypot entity, a threat response trigger from the local-network honeypot entity to the local-network backend entity, and a threat response operation by the local-network backend entity. Details of such operational sequence are described below with reference to FIG. 2.

In an embodiment, it is assumed that the attacker has stolen, social engineered or received username/password related authentication datas valid for some account of the local network, such as the local-network entity 400. The username/password related authentication data may comprise any of: username/password credentials, a password hash, a Kerberos ticket or any other data used to authenticate a user in a communication network. The attacker then tries to login to one or more systems in the local network, one of those being the local-network honeypot entity 100. As the honeypot entity is able to pretend multiple systems and to log usernames and passwords from login attempts, this behavior of the attacker can be used to detect stolen passwords/password hashes/Kerberos tickets that are being used.

In an embodiment, every login attempt made against the honeypot entity 100 may be recorded and then the validity of username/password combinations used in these login attempts to any accounts in an organization are verified or random brute forcing may be used. In an embodiment, the verification may be implemented by verification against an active directory or other central authentication resources, by maintaining a separate list of strongly salted username/password combinations or by simply performing login attempts on different systems that are being protected. In an embodiment, if the used username/password combination can be verified successfully to be valid to a certain account/system 400 in the local network, then it can be determined that the security of this account/system 400 has been compromised. In an embodiment, an alarm may be signaled based on successful verification and the compromised account/system 400 may be locked automatically. In an embodiment, the passwords used in such attacks may be blacklisted. In an embodiment, the endpoint threat management system may also block or isolate the local-network host on local-network level, and/or block or isolate at least one process of the local-network host relating to the detected compromise.

Figure 2:
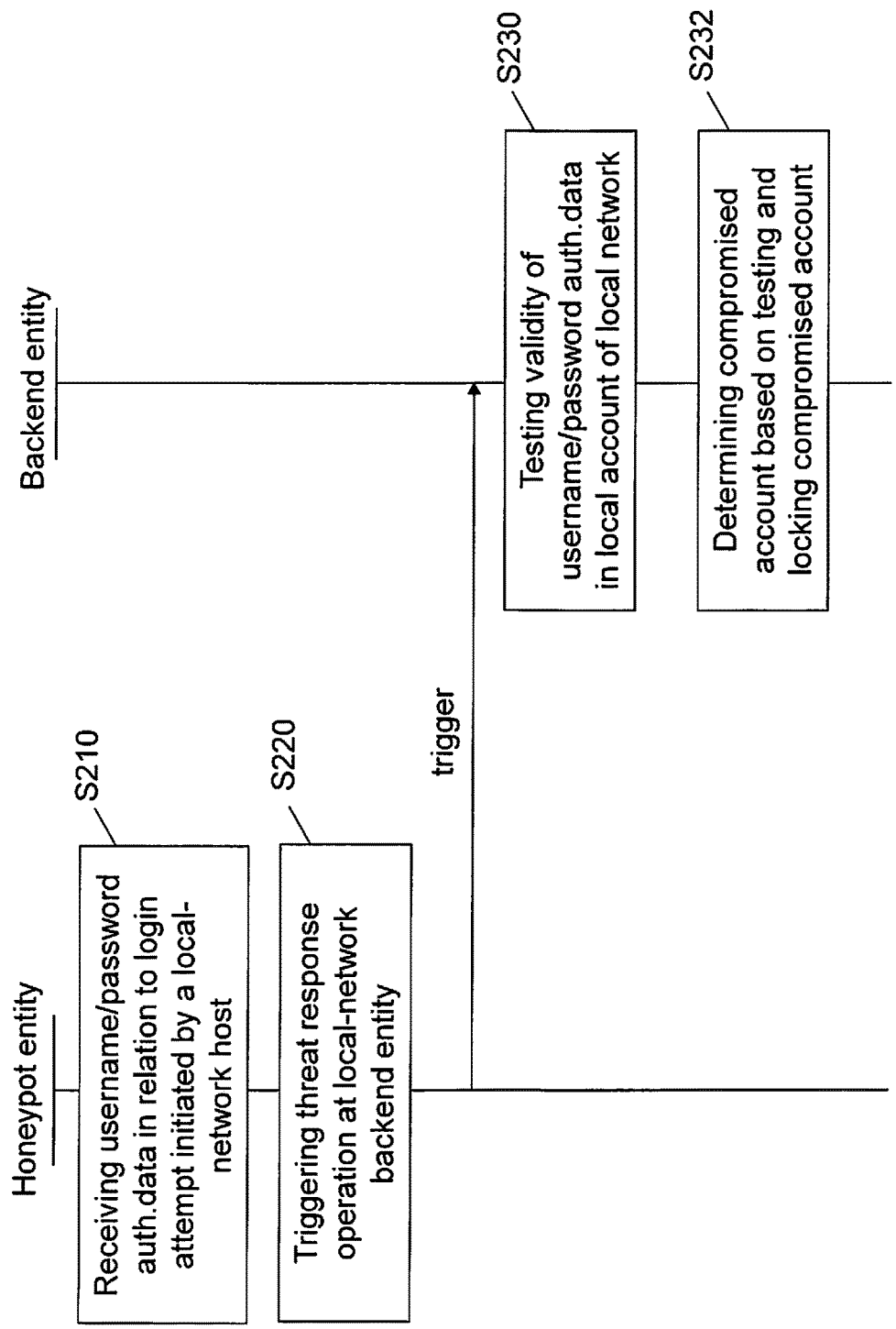
FIG. 2 shows a diagram illustrating an example of a procedure for realizing an advanced local-network threat response according to exemplifying embodiments of the present invention.

FIG. 2 shows a diagram illustrating an example of a procedure for realizing an advanced local-network threat response according to exemplifying embodiments of the present invention. As shown in FIG. 2, a procedure for realizing an advanced local-network threat response according to one embodiment of the present invention comprises various operations at a local-network honeypot entity and a local-network backend entity as illustrated in FIG. 1.

Specifically, the honeypot entity receives a username/password related authentication data in relation to a login attempt initiated by the host (S210). Since the received username/password related authentication data is not valid for the honeypot entity, it can be determined this is a security threat. The honeypot entity triggers a threat response operation at a local-network backend entity upon detection of the invalid username/password related authentication data by the local-network honeypot entity (S220). For triggering, the honeypot entity generates and transmits a corresponding trigger, which may be based on the detected username/password related authentication data. The thus transmitted trigger may comprise or may be accompanied by host information for example. That is, together with the trigger, information on at least a network address, such as the IP address, of the host initiating the detected security threat is transferred from the honeypot entity to the backend entity.

Based on (receipt of) the trigger from the honeypot entity, the backend entity executes a corresponding threat response operation (S230, S232). Such threat response operation is based on the received username/password related authentication data, and includes an operation of testing the validity of the username/password related authentication data in one or more local accounts of the local network and, in case the username/password related authentication data is detected to be valid for any account in the local-network on the basis of testing, determining that said account is compromised and locking the compromised account.

Although not shown, the backend entity may also generate a report (threat response report) using any information retrieved in the course of the threat response operation.

The local-network may maintain a database where the results of previous threat response operations are registered. Such results may include e.g. any suspect/blacklisted username/password related authentication data stored/tested and/or one or more security vulnerabilities of any previously (recently) scanned local-network host.

In an embodiment, various information can be retrieved, which are useful for the further threat response operation, including e.g. information on properties of the host, information on properties of the detected security threat, or the like. For example, such information may include or relate to e.g. previously stored username/password credentials, opened port/s, ongoing service/s, system version/s, one or more security vulnerabilities of any previously (recently) scanned local-network host.

A combined report can be generated and issued, which comprises information retrieved by/in the endpoint threat management system and information retrieved by/in local-network vulnerability management system. Such report can show that some threat response operation is or will be initiated, and/or prompt a user to carry our certain measures or actions.

By virtue of exemplifying embodiments of the present invention, as described above, an advanced local-network threat response is enabled, which is capable of provide for both high speed and efficiency for responding to a security threat in a local network.

Namely, the technique according to exemplifying embodiments of the present invention enables that the effect of an attack related to stolen credentials/authentication data can be reliably recognized and responded to automatically and instantaneously.

The above-described methods, procedures and functions may be implemented by respective functional elements, entities, modules, units, processors, or the like, as described below.

While in the foregoing exemplifying embodiments of the present invention are described mainly with reference to methods, procedures and functions, corresponding exemplifying embodiments of the present invention also cover respective apparatuses, entities, modules, units, nodes and systems, including both software and/or hardware thereof.

Respective exemplifying embodiments of the present invention are described below referring to FIG. 3, while for the sake of brevity reference is made to the detailed description of respective corresponding configurations/setups, schemes, methods and functionality, principles and operations according to FIGS. 1 to 2.

Figure 3:
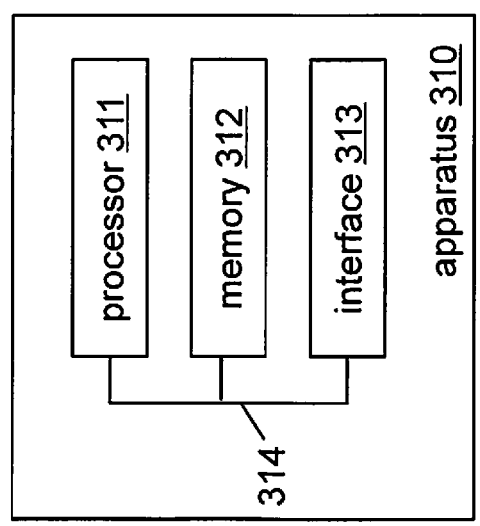
FIG. 3 shows a schematic diagram illustrating an example of a structure of an apparatus according to exemplifying embodiments of the present invention.

In FIG. 3, the solid line blocks are basically configured to perform respective methods, procedures and/or functions as described above. The entirety of solid line blocks are basically configured to perform the methods, procedures and/or functions as described above, respectively. With respect to FIG. 3, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIG. 3, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories, a display, or the like. Among others, one or more memories are provided for storing programs or program instructions for controlling or enabling the individual functional entities or any combination thereof to operate as described herein in relation to exemplifying embodiments.

In general terms, respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated devices/apparatuses are suitable for use in practicing one or more of the exemplifying embodiments of the present invention, as described herein.

FIG. 3 shows a schematic diagram illustrating an example of a structure of an apparatus according to exemplifying embodiments of the present invention.

As indicated in FIG. 3, an apparatus 310 according to exemplifying embodiments of the present invention may comprise at least one processor 311 and at least one memory 312 (and possibly also at least one interface 313), which may be operationally connected or coupled, for example by a bus 314 or the like, respectively.

The processor 311 of the apparatus 310 is configured to read and execute computer program code stored in the memory 312. The processor may be represented by a CPU (Central Processing Unit), a MPU (Micro Processor Unit), etc, or a combination thereof. The memory 312 of the apparatus 310 is configured to store computer program code, such as respective programs, computer/processor-executable instructions, macros or applets, etc. or parts of them. Such computer program code, when executed by the processor 311, enables the apparatus 310 to operate in accordance with exemplifying embodiments of the present invention. The memory 312 may be represented by a RAM (Random Access Memory), a ROM (Read Only Memory), a hard disk, a secondary storage device, etc., or a combination of two or more of these. The interface 313 of the apparatus 310 is configured to interface with another apparatus and/or the user of the apparatus. That is, the interface 313 may represent a communication interface (including e.g. a modem, an antenna, a transmitter, a receiver, a transceiver, or the like) and/or a user interface (such as a display, touch screen, keyboard, mouse, signal light, loudspeaker, or the like).

The apparatus 310 may, for example, represent a (part of a) system, such as the combination of the honeypot entity 100 and the backend entity 200 in FIG. 1 (as indicated by the dash-dotted box). The apparatus 310 may be configured to perform a procedure and/or exhibit a functionality of an embodiment of the invention.

When representing the (a part of the) system, the apparatus 310 or its processor 311 (possibly together with computer program code stored in the memory 312), in its most basic form, is configured to receive, at a local-network honeypot entity, a username/password related authentication data in relation to a login attempt to the honeypot entity, trigger a threat response operation at a local-network backend entity upon detection of the username/password related authentication data by the local-network honeypot entity, the threat response operation comprising testing validity of the username/password related authentication data in one or more local accounts of the local-network; and in case the username/password related authentication data is detected to be valid for any account in the local-network on the basis of testing, determine that said account is compromised and locking the compromised account.

When representing the (a part of the) honeypot entity, the apparatus 310 or its processor 311 (possibly together with computer program code stored in the memory 312), in its most basic form, is configured to receive a username/password related authentication data in relation to a login attempt to the honeypot entity and to trigger a threat response operation at a local-network backend entity upon detection of the username/password related authentication data.

When representing the (a part of the) backend entity, the apparatus 310 or its processor 311 (possibly together with computer program code stored in the memory 312), in its most basic form, is configured to receive a trigger from a local-network honeypot entity (for responding to a security threat initiated by a local-network host at the local-network honeypot entity), and to execute the threat response operation, said threat response operation comprising testing validity of the username/password related authentication data in one or more local accounts of the local-network; and in case the username/password related authentication data is detected to be valid for any account in the local-network on the basis of testing, determining that said account is compromised and locking the compromised account.

Accordingly, any one of the above-described schemes, methods, procedures, principles and operations may be realized in a computer-implemented manner.

Any apparatus according to exemplifying embodiments of the present invention may be structured by comprising respective units or means for performing corresponding operations, procedures and/or functions. For example, such means may be implemented/realized on the basis of an apparatus structure, as exemplified in FIG. 3 above, i.e. by one or more processors 311, one or more memories 312, one or more interfaces 313, or any combination thereof.

For further details regarding the operability/functionality of the individual elements according to exemplifying embodiments of the present invention, reference is made to the above description in connection with any one of FIGS. 1 to 3, respectively.

According to exemplifying embodiments of the present invention, any one of the processor, the memory and the interface may be implemented as individual modules, chips, chipsets, circuitries or the like, or one or more of them can be implemented as a common module, chip, chipset, circuitry or the like, respectively.

According to exemplifying embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units, means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible or non-transitory medium such as a computer-readable (storage) medium having stored thereon a respective data structure or code means/portions or embodied in a signal or in a chip, potentially during processing thereof. A computer program product encompasses a computer memory encoded with executable instructions representing a computer program for operating/driving a computer connected to a network.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for enabling advanced local-network threat response. Such measures could exemplarily comprise receiving, at a local-network honeypot entity, a username/password related authentication data in relation to a login attempt to the honeypot entity, triggering a threat response operation at a local-network backend entity upon detection of the username/password related authentication data by the local-network honeypot entity, the threat response operation comprising testing validity of the username/password related authentication data in one or more local accounts of the local-network, and in case the username/password related authentication data is detected to be valid for any account in the local-network on the basis of testing, determining that said account is compromised and locking the compromised account.

Even though the invention is described above with reference to the examples and exemplifying embodiments with reference to the accompanying drawings, it is to be understood that the present invention is not restricted thereto. Rather, it is apparent to those skilled in the art that the above description of examples and exemplifying embodiments is for illustrative purposes and is to be considered to be exemplary and non-limiting in all respects, and the present invention can be modified in many ways without departing from the scope of the inventive idea as disclosed herein.

The invention claimed is:

1. A method of local-network threat response, the method comprising:
   receiving, at a local-network honeypot entity, a username/password related authentication data in relation to a login attempt to the honeypot entity, the username/password related authentication data being invalid for the honeypot entity but being valid for an account;
   triggering a threat response operation at a local-network backend entity upon detection of the username/password related authentication data by the local-network honeypot entity, the threat response operation occurring prior to a further login attempt using the username/password related authentication data and comprising testing validity of the username/password related authentication data in one or more local accounts of the local-network; and
   in response to determining that the username/password related authentication data is valid for the account in the local-network on the basis of testing, determining that said account is compromised and locking the compromised account.

2. The method according to claim 1, wherein the username/password related authentication data comprises any of: username/password credentials, a password hash, a Kerberos ticket.

3. The method according to claim 1, further comprising: storing the username/password related authentication data received from any login attempts at the local-network honeypot entity for further use by the threat response operation.

4. The method according to claim 1, said threat response operation comprising one or more of: testing validity of the username/password related authentication data against active directory or other authentication resource of the local-network; verifying validity of the username/password related authentication data on basis of a maintained list of username/password related authentication data used in the local accounts of the local-network.

5. The method according to claim 1, said threat response operation further comprising: making login attempts on one or more local accounts of the local-network by using the received username/password related authentication data and in case the login attempt is successful, determining that said local account is compromised.

6. The method according to claim 1, said triggering further comprising: transferring information on the IP address of the local-network host initiating the login attempt from the local-network honeypot entity to the local-network backend entity.

7. The method according to claim 1, further comprising, at an endpoint threat management system: blocking or isolating the local-network host on local-network level, and/or blocking or isolating at least one process of the local-network host relating to the detected compromise.

8. An apparatus, comprising a memory configured to store computer program code, and a processor configured to read and execute computer program code stored in the memory, wherein the processor is configured to cause the apparatus to perform:
   receiving, at a local-network honeypot entity, a username/password related authentication data in relation to a login attempt to the honeypot entity, the username/password related authentication data being invalid for the honeypot entity but being valid for an account;
   triggering a threat response operation at a local-network backend entity upon detection of the username/password related authentication data by the local-network honeypot entity, the threat response operation occurring prior to a further login attempt using the username/password related authentication data and comprising testing validity of the username/password related authentication data in one or more local accounts of the local-network; and
   in response to determining that the username/password related authentication data is valid for the account in the local-network on the basis of testing, determining that said account is compromised and locking the compromised account.

9. The apparatus according to claim 8, wherein the processor is configured to cause the apparatus to perform: storing the username/password related authentication data received from any login attempts at the local-network honeypot entity for further use by the threat response operation.

10. The apparatus according to claim 8, wherein the processor is configured to cause the apparatus to perform said threat response operation by one or more of: testing validity of the username/password related authentication data against active directory or other authentication resource of the local-network; verifying validity of the username/password related authentication data on basis of a maintained list of username/password related authentication data used in the local accounts of the local-network.

11. The apparatus according to claim 8, wherein the processor is configured to cause the apparatus to perform said threat response operation by: making login attempts on one or more local accounts of the local-network by using the received username/password related authentication data and in case the login attempt is successful, determining that said local account is compromised.

12. The apparatus according to claim 8, wherein the processor is configured to cause the apparatus to perform: blocking or isolating the local-network host on local-network level, and/or blocking or isolating at least one process of the local-network host relating to the detected compromise.

13. A non-transitory computer storage medium having stored thereon computer program code which when executed by a processor, causes the processor to execute a method of local-network threat response, the method comprising:

receiving, at a local-network honeypot entity, a username/password related authentication data in relation to a login attempt to the honeypot entity, the username/password related authentication data being invalid for the honeypot entity but being valid for an account;

triggering a threat response operation at a local-network backend entity upon detection of the username/password related authentication data by the local-network honeypot entity, the threat response operation occurring prior to a further login attempt using the username/password related authentication data and comprising testing validity of the username/password related authentication data in one or more local accounts of the local-network; and in response to determining that the username/password related authentication data is valid for the account in the local-network on the basis of testing, determining that said account is compromised and locking the compromised account.

* * * * *